April 24, 1956 R. E. SCOTT 2,742,671
APPARATUS FOR PRODUCING FASTENING DEVICE
Original Filed April 13, 1950 2 Sheets-Sheet 1
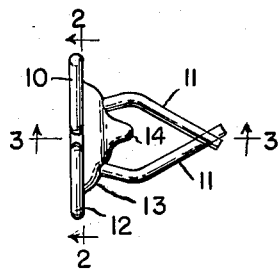
FIG.I.
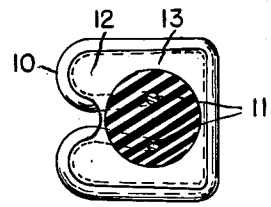
FIG.2.
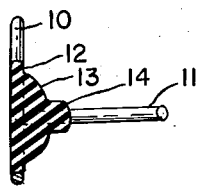
FIG.3.
FIG.4.
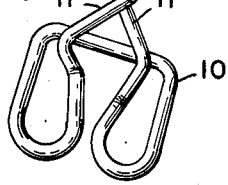
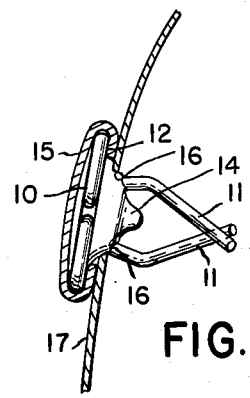
FIG.5.
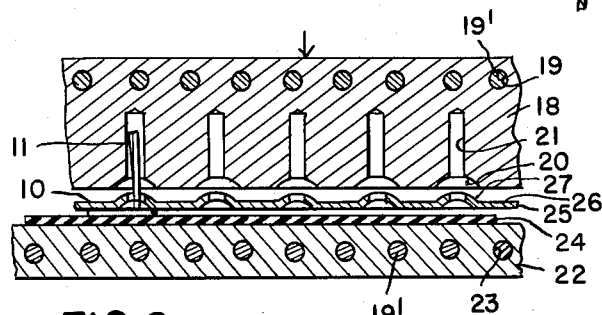
FIG.6.
INVENTOR.
ROBERT E. SCOTT
BY
Whitmore, Hulbert & Belknap
ATTORNEYS April 24, 1956 R. E. SCOTT 2,742,671
APPARATUS FOR PRODUCING FASTENING DEVICE
Original Filed April 13, 1950 2 Sheets-Sheet 2

*INVENTOR.*
ROBERT E. SCOTT
BY
*Whittemore, Hulbert & Belknap*
ATTORNEYS

United States Patent Office 2,742,671
Patented Apr. 24, 1956

2,742,671

APPARATUS FOR PRODUCING FASTENING DEVICE

Robert E. Scott, Detroit, Mich., assignor to Gagnier Fibre Products Company, Detroit, Mich., a corporation of Michigan Original application April 13, 1950, Serial No. 155,666. Divided and this application October 1, 1951, Serial No. 249,072

1 Claim. (Cl. 18—36)

This invention relates to apparatus for use in the manufacture of fastener elements, and is a division of my copending application Serial No. 155,666 filed April 13, 1950.

More particularly the invention concerns itself with a die assembly capable of producing on a production basis fastener elements having a head, a shank projecting outwardly from the head, and a body of sealing material at the juncture of the shank with the head. Such fastener elements are particularly suitable for attaching weather stripping and decorative metal on the exterior surface of a motor vehicle while preventing leaks at the points where holes are provided in the vehicle body to receive the fastener.

A type of fastener which has found wide use in automobile construction is illustrated in Figure 4 of the accompanying drawings and comprises generally a single piece of wire formed into a head portion and a shank portion, the shank portion consisting of two legs positioned substantially normal to the plane of the head portion and bowed outwardly with respect to each other between the head and the tip of the shank. The tips of the legs are usually in close proximity to each other and commonly overlap.

In the attaching of metal trim to an automobile body, for example, the head portion engages the trim and the legs are forced through a hole provided in the body.

In this connection, however, a severe problem has been encountered in that a bad leak is created by the presence of the hole whereby water can reach interior appointments as well as interior metal surfaces which have not been protected against external corrosive influences. Attempts have been made to stop such leaks by the use of soft rubber gaskets, but difficulty has been experienced in fitting gaskets properly to the odd shapes which are characteristic of this type of fastener. Such separable gaskets, however, carefully formed, permit some leakage along the surfaces of the fastener legs. Further, they have an added disadvantage in that the gaskets are positioned by hand and mass production techniques result in an appreciable number of such gaskets being omitted. Some of this difficulty stems from carelessness of labor and some from a tearing of the gasket as it is slipped over the bowed portion of the fastener legs. Whatever the reason, however, many fasteners are used without the gasket provided therefor.

The foregoing difficulties are overcome herein by providing a fastener of the general type noted above with means in the form of a body of sealing material integrally bonded at the juncture of the head with the shank, and it is an object of this invention to provide a simple, inexpensive die assembly rendering it possible to produce such fastener elements on an economical production basis.

I have now found that the foregoing and related objects can be secured in a fastening device comprising a plastic mass and wire embedded in said mass to form a head portion for said device and spaced wires extending outwardly from said mass to form a shank portion for said device, the spaced wires of the shank being bowed outwardly with respect to each other between the head portion and the tip of the shank and being yieldably movable with respect to each other.

In the use of a thermoplastic body, the method of forming the fastening device of the invention comprises positioning the thermoplastic material in contact with the fastener; applying a pressure to the thermoplastic, the pressure having a principal vector toward the junction of the head and shank; and heating the thermoplastic sufficiently to cause it to flow into the space surrounding said junction.

The die assembly for manufacturing the fastener of the invention, wherein the fastener comprises a head and a shank, comprises a backing member for the fastener; means for heating the assembly; and a forming die adapted to press the thermoplastic material against the head and comprising a plurality of substantially uniformly spaced dimples joined by flat web portions and being provided with a hole at the center of each of said dimples to receive the shank when the forming die is pressed against the head. When a thermoset resin is used in the invention, the dimples provide a mold space in which the condensing agents are held while the plastic forming reaction is carried out.

Other and more detailed objects of the invention will become apparent from a consideration of the following specification, the appended claim and the accompanying drawings, throughout the several views of which like reference characters indicate like parts, and wherein:

Figure 1 illustrates an embodiment of the fastening device of the invention;

Figure 2 is a cross sectional view of Figure 1 taken through line 2—2;

Figure 3 is a cross sectional view of Figure 1 taken through the line 3—3;

Figure 4 illustrates an embodiment of the wire portion of the fastener of the invention;

Figure 5 illustrates a manner of using the fastener of the invention in the attaching of a decorative molding to an automobile body;

Figure 6 illustrates a die assembly suitable for use in the manufacture of the fastener;

Figure 7:
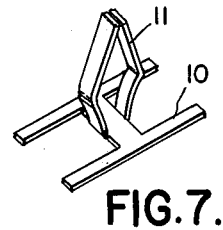
Figure 7 illustrates an embodiment of the wire portion of the fastener in a form which can be conveniently stamped from sheet metal.
Figure 8:
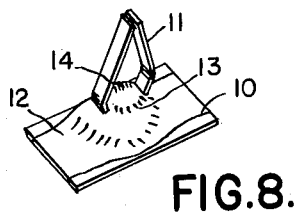
Figure 8 illustrates an integrally formed wire and thermoplastic fastener wherein the wire portion is similar to the structure of Figure 7.
Figure 9:
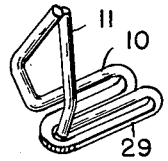
Figure 9 illustrates a wire fastener similar to the fastener of Figure 4 with a modified head portion.

Referring more particularly to the drawings, the wire portion of the fastener of the invention consists generally of a wire head portion 10 and leg portions 11 which are preferably formed from a single piece of wire as illustrated in Figure 4. A thermoplastic body which consists of a sheet portion 12, and a dome portion 13 is integrally formed in the fastener in a manner such that the dome portion completely encloses a portion of each of the legs; that is, this portion of the legs is actually embedded in the thermoplastic body. The sheet portion 12 is pisitioned substantially in the plane of the wire portion 10 in a manner such that the wire forms an intimately contacting border for the sheet. A tuft 14 of the thermoplastic material is normally deposited at the apex of the dome 13 in the forming operation.

With specific reference to Figure 5, the head portion, comprising the sheet 12 and its wire border 10, is in engagement with a decorative metal piece 15 while the wire shank, that is legs 11, is inserted through an opening 16 in a portion of an automobile body 17. The opening 16 has a diameter somewhat smaller than the widest point between the bowed legs such that the legs, when being inserted, are forced together as the fastener is inserted and subsequently spring apart and press against the sides of opening 16. In this manner portion of the thermoplastic body are brought to bear against the metal surfaces of the automobile body surrounding the opening 16.

Figure 6 illustrates an apparatus suitable for forming the fastener of the invention. An upper die plate 18 is provided with openings 19 adapted to receive heating elements (19'). The upper die plate 18 is also provided with recesses 20 and the holes 21 extending inwardly from the recesses. A lower die plate or backing plate 22 is provided with openings 23 adapted to receive heating elements (19'). A rubber mat 24 or the like is shown positioned on the top surface of the backing plate. A forming die 25 consists of a plate having flat web portions 26 and dimples 27. Each of the dimples is shaped to conform with the shape of the recesses 20 in the upper die plate 18. Each dimple is also provided with an opening 28 which is adapted to lie concentrically to the corresponding hole 21 in the upper die plate.

Figures 7, 9, 11 and 13 illustrate the various types of wire fasteners which may be used in the present invention. In this connection the word "wire" is used broadly to include members other than those with circular cross sections. The particular shape of the cross section of such elements is not critical to the invention, and the word "wire" as used herein is intended to cover threads, filaments, and the like.

With particular reference to Figures 9, 10, 13 and 14 a modified head portion is shown which comprises a member 29 lying substantially parallel to and spaced from the head portion 10. These additional appendages to the head portion have been found useful, as hooks for the fastening of additional elements. The presence or absence of such appendages is not critical to the invention. Rather, my invention is directed particularly to the generally L-shaped portion at the junction of the head and shank.

Figure 10:
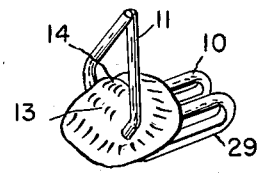
Figure 10 illustrates an integrally formed wire and thermoplastic fastener wherein the wire portion is similar to the fastener of Figure 9.
Figures 11, 13:
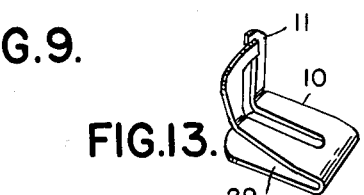
Figure 11 illustrates a form of wire fastener which can be conveniently stamped from sheet metal.
Figure 13 illustrates a wire fastener similar to that shown in Figure 11 except that a modified head portion is shown.
Figure 14:
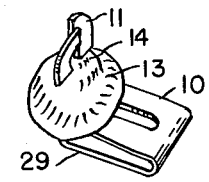
Figure 14 illustrates an integrally formed wire and thermoplastic fastener wherein the wire portion is similar to that of Figure 13.
Figure 15:
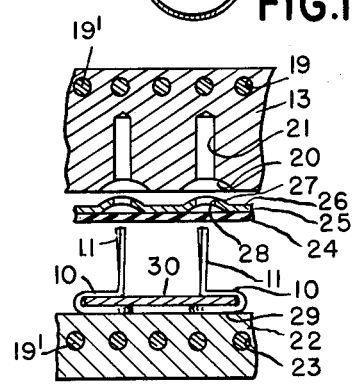
Figure 15 illustrates a die assembly suitable for use in the manufacturing of fasteners similar to those shown in Figure 10 and Figure 14 in which the modified head portion is used.
Figure 12:
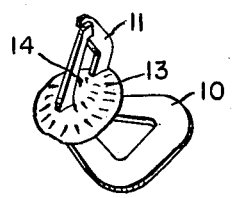
Figure 12 illustrates an integrally formed wire and thermoplastic fastener wherein the wire portion is similar to the fastener of Figure 11.

Figure 15 illustrates a die assembly adapted to make fasteners of the type shown in Figures 10 and 14. The assembly is similar to that shown in Figure 6 except that an additional backing plate 30 is positioned below the head portion 10. As shown it is most practical to use a single backing plate to serve two oppositely disposed rows of fasteners.

In the operation of the die assembly of Figure 6 the forming die 25 carries the wire portion of the fastener to the apparatus in the manner shown; that is, with the head 10 of the wire portion in engagement with the flat portions 25 of the forming die and the legs 11 of the wire portion extending through the opening 28 in the dimple 27. The forming die, equipped with wire portions, is placed over the rubber mat 24 or other suitable thermoplastic material which is positioned on the lower die. The upper die is then brought down in a manner such that the legs of the fastener wire enter the holes 21 in the upper die plate. When the surface of the recesses 20 in the upper die plate contact the upper surface of the dimples, the forming die 25 moves downwardly and forces the head portion 10 of the wire through the thermoplastic material 24 which may be softened sufficiently to flow by the heating of the die plates. The thickness of the rubber mat 24 is usually somewhat greater than the thickness of the wire of the fastener. In this manner the wire portion 10 cuts its way through the plastic and a portion of the latter is displaced upwardly into the dimple to form the dome and to embed the lower portion of the legs. Excess material, as the tuft 14, is permitted to flow unrestricted through the opening in the dimple, and along the surfaces of the shank. At the completion of the operation and when the formed plastic is sufficiently cool so as to retain its shape, the individual fasteners may then be removed from the resulting matrix.

In the operation of the die assembly of Figure 15 the rubber mat 24 is positioned above the fastener shanks. The upper die plate 18 is moved downwardly which in turn causes the forming die 25 to move downwardly against the rubber mat. Shank portions 11 pierce the rubber mat and pass through the hole 28 into the recesses 21. As the upper die plate and forming die continue downwardly, the rubber mat is pressed against the head portion 10 and the backing plate 30. This causes the heated rubber to be directed toward the junction of the head and shank portions and to take the shape of the dimple 27. Excess thermoplastic material is allowed to flow unrestricted through the opening 28 and along the surfaces of the shank.

The head portion of the fastener may be flat or may be curved to adapt itself to the curvature of the materials being fastened. It will be apparent that the thermoplastic body can be formed on a wire head portion which is curved either concavely or convexly in the same manner as described in connection with a flat head portion. Where curved wire head portions are used, it is necessary merely to effect a corresponding change in the contour of the backing plate below the positions assumed by the wire of the fastener head. It is necessary that the wire head portion and the surface of the backing plate have substantially the same curvature in order that a clean cut may be made as the wire moves through the thermoplastic material to contact the backing plate.

In uses where it is desired to use a thermoset resin such as a phenol-formaldehyde resin and the like, the reaction mixture of the condensing agents can be placed in the space between the underside of a dimple and the top of the backing plate. In this instance the fasteners are positioned on the backing plate and the forming die containing the dimples is positioned against the fastener heads and with the fastener shank extending upwardly through the holes in the dimples. The reaction material for forming the thermoset resin can be introduced through said holes and the entire assembly is permitted to stand until the resin has set up sufficiently to maintain its shape.

Similarly, polymer emulsions and solutions can be inserted into the cavity beneath the dimples to leave a solid plastic residue on evaporation. In this manner foam rubber or other plastic material can be deposited in intimate contact with the shank and head portions to form a fastener of the desired type.

The number of spaced wires in either the shank or head is not critical to the invention. It has become standard practice to form a shank from two legs, but it will be apparent that three or more legs could be used. The head portion similarly can comprise any number of spaced wires or can be solid. In this latter connection and as indicated previously, the word "wire" is used herein to mean any metal strip, filament, thread or the like which may be formed into the type of fastener described.

In most uses the plastic body can be limited to a dome shaped portion similar to that shown in the drawings. However, many fastener heads, e. g. Figure 4 and Figure 7, appear to be more satisfactory if a portion of the plastic body lies in the plane of the head and contacting all the wire portion of the head.

The exact shape of dimensions of either the sheet portion of dome portion of the plastic body is not critical to the invention. Rather, in each instance they can be adapted to the particular conditions encountered. For example the width of the dome portion must be such as to completely seal the hole in the sheet which is penetrated by the legs of the fastener. Similarly it is preferred that the sheet portion of the plastic body have sufficient area to make a suitable frictional contact with the material surface in engagement therewith and to provide some resistance to displacement of the plastic body.

The nature of the plastic material is not critical to the invention. However the principal utility of the invention is in creating a watertight seal and therefore a soft rubber has been found most suitable in most uses. In other uses, however, relatively harder thermoplastic materials may be found more desirable. For example, where the fastener may be subjected to stresses which act on the plastic body, it is preferred that plastics presenting a relatively tough wear-resistant, yet somewhat resilient, surface may be used. The copolymers of vinyl chloride are examples of such materials.

The article of the invention has found its greatest use in the securing of ornamental metal strips to the exterior surfaces of motor vehicles, but has also found use in the attachment of weather stripping, gasketing, molding, particularly where a water-tight seal is desired. In addition to the more obvious advantages of the integrally formed metal and plastic structure, the article of the invention is more economical in its application than the combination of wire fasteners and separate gasket pieces. The latter not only have to be formed in a separate operation, but must be fitted to the fasteners usually by hand. The article of the invention also makes unnecessary the use of such materials as cements and the like which are frequently used in order to produce a water seal.

What I claim as my invention is:

A die assembly for manufacturing integrally formed wire and thermoplastic fasteners wherein the fasteners each comprise a head shaped to provide an open border frame and a shank joined to and projecting transversely from the head, said assembly comprising plates supported for relative movement toward and away from each other and adapted to receive therebetween a body of thermoplastic material, a forming member positioned between one of said plates and the body of thermoplastic material and movable relative to said plates, said member being embossed at a plurality of uniformly spaced points to form recesses facing the body and having an opening therethrough at the base of each recess for receiving the shanks of fasteners inserted between the forming member and body of thermoplastic material, said forming member having flat surfaces facing the other plate and respectively surrounding the recesses and said other plate having flat surfaces facing said forming member and respectively registering with the flat surfaces of said forming member, and means for heating the assembly, said surfaces being arranged to engage opposite sides of the border frame of the fasteners thus inserted and to force the border frames through the body of thermoplastic material upon relative movement of said plates toward each other, thereby severing the portions of said body of thermoplastic material within said border frames from the remainder of the body and displacing a part of the severed portions into the recesses around the junctures of the shanks and heads of the fasteners, the face of said one plate adjacent to said forming member having recesses positioned to receive the respective embossed portions of said member and having a clearance space at the base of each recess therein for receiving the shanks of the fasteners upon relative movement of the plates toward each other.

References Cited in the file of this patent

UNITED STATES PATENTS

| | | |
|---|---|---|
| 305,564 | Bapterosses | Sept. 23, 1884 |
| 1,621,000 | Crowley | Mar. 15, 1927 |
| 1,663,587 | Dunbar | Mar. 27, 1928 |
| 1,935,942 | Conner | Nov. 21, 1933 |
| 2,458,327 | Wood | Jan. 4, 1949 |

FOREIGN PATENTS

| | | |
|---|---|---|
| 87,812 | Sweden | Aug. 24, 1935 |